(12) United States Patent
Yamawaki

(10) Patent No.: US 8,365,573 B2
(45) Date of Patent: Feb. 5, 2013

(54) MANDREL, SET OF MANDRELS, AND HOLLOW RACK BAR

(75) Inventor: Takashi Yamawaki, Shinagawa-ku (JP)

(73) Assignee: Neutron Co., Ltd., Tokyo (JP)

( * ) Notice: Subject to any disclaimer, the term of this patent is extended or adjusted under 35 U.S.C. 154(b) by 387 days.

(21) Appl. No.: 12/035,157

(22) Filed: Feb. 21, 2008

(65) Prior Publication Data

US 2008/0202270 A1  Aug. 28, 2008

(30) Foreign Application Priority Data

| | | |
|---|---|---|
| Feb. 23, 2007 | (JP) | 2007-044276 |
| Mar. 27, 2007 | (JP) | 2007-082292 |
| Mar. 27, 2007 | (JP) | 2007-082293 |
| Mar. 29, 2007 | (JP) | 2007-089605 |

(51) Int. Cl.
   *B21D 17/00* (2006.01)
(52) U.S. Cl. ...... 72/469; 72/352; 72/370.01; 72/370.19; 72/462
(58) Field of Classification Search .............. 72/264, 72/266, 353.2, 354.2, 354.6, 357, 360, 361, 72/370.01, 370.04, 370.19, 370.2, 370.24, 72/370.25, 462, 469, 352, 358, 359; 29/893.34, 29/897.2
   See application file for complete search history.

(56) References Cited

U.S. PATENT DOCUMENTS

| | | | |
|---|---|---|---|
| 3,892,121 A | | 7/1975 | Champoux et al. |
| 4,133,221 A | * | 1/1979 | Clary .............................. 74/498 |
| 4,878,370 A | * | 11/1989 | Fuhrman et al. ................. 72/264 |
| 5,325,698 A | * | 7/1994 | Nagpal et al. .................... 72/267 |
| 5,983,695 A | * | 11/1999 | Lutz ............................ 72/370.19 |
| 6,442,992 B2 | * | 9/2002 | Tsubouchi et al. ........ 72/370.21 |
| 6,494,073 B2 | | 12/2002 | Oka |
| 6,575,009 B2 | | 6/2003 | Shiokawa |
| 6,718,813 B2 | * | 4/2004 | Yasuda et al. ............. 72/370.04 |
| 7,168,284 B2 | | 1/2007 | Shiokawa |
| 7,225,541 B2 | * | 6/2007 | Kubota ........................ 29/897.2 |
| 2002/0044439 A1 | | 4/2002 | Shiokawa |

FOREIGN PATENT DOCUMENTS

| | | |
|---|---|---|
| EP | 0086344 | 8/1983 |
| EP | 1447158 | 8/2004 |
| JP | 3-5892 B2 | 1/1991 |
| JP | 4-167944 | 6/1992 |
| JP | 2000177604 | 6/2000 |
| JP | 2000202522 | 7/2000 |
| JP | 2001293528 | 10/2001 |
| JP | 2001300677 | 10/2001 |
| JP | 2002066685 | 3/2002 |
| JP | 2002086243 | 3/2002 |
| JP | 2002143979 | 5/2002 |
| JP | 2002178095 | 6/2002 |
| JP | 2005028924 | 2/2005 |
| JP | 2006-26703 A | 2/2006 |
| JP | 2006103644 | 4/2006 |

* cited by examiner

*Primary Examiner* — Edward Tolan
(74) *Attorney, Agent, or Firm* — Baker & Hostetler LLP

(57) ABSTRACT

The present invention includes a bar having a maximum cross section region smaller than a minimum cross section region of a hollow portion of a pipe P, and projected portions mounted along an axial direction of the bar and including a projected portion with maximum extent Hb, extent Ha of the projected portion positioned at a leading end side of the bar is set to be smaller than extent Hb of the projected portion positioned at a center side in the axial direction, and extent Hc of the projected portion positioned at a base end side of the bar is set to be less than or equal to extent Hb of the projected portion.

7 Claims, 12 Drawing Sheets

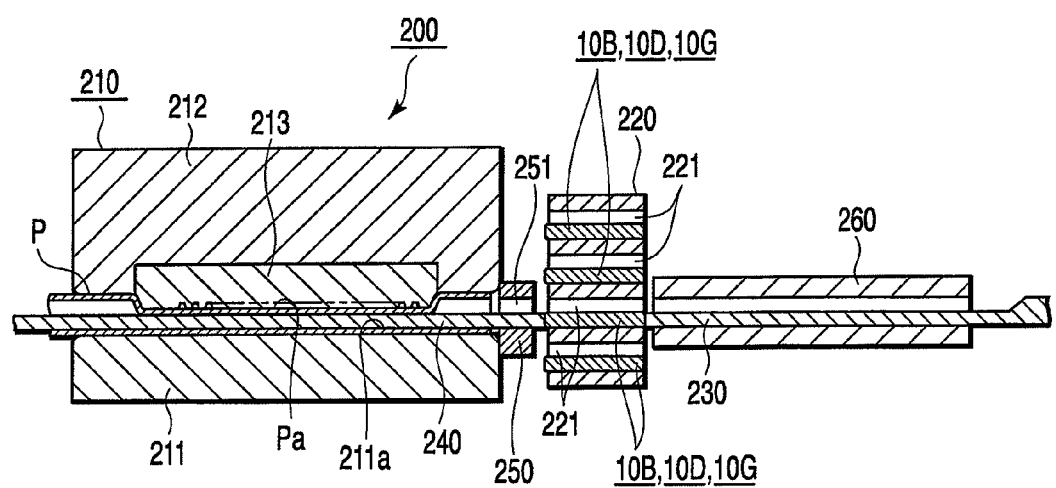
F I G. 4

MANDREL, SET OF MANDRELS, AND HOLLOW RACK BAR

CROSS-REFERENCE TO RELATED APPLICATIONS

This application is based upon and claims the benefit of priority from the prior Japanese Patent Applications No. 2007-044276, filed Feb. 23, 2007; No. 2007-082292, filed Mar. 27, 2007; No. 2007-082293, filed Mar. 27, 2007; and No. 2007-089605, filed Mar. 29, 2007, the entire contents of all of which are incorporated herein by reference.

BACKGROUND OF THE INVENTION

1. Field of the Invention

The present invention relates to a mandrel used for manufacturing hollow portions such as a hollow rack bar, etc. used for a power steering system of a car, or the like, a set of mandrels, and a hollow rack bar manufactured using the mandrel.

2. Description of the Related Art

The related arts have manufactured a hollow rack bar (hollow portion) used for a power steering system of a car by cutting a round bar. However, in order to meet a sophisticated shape and lightweight, a method of manufacturing the hollow rack bar by performing a transfer forging process on a pipe has well been known (for example, see Jpn. Pat. Appln. KOKOKU Publication No. 3-5892). Specifically, the pipe is first pressed by a hot forging die so that it is primarily molded in a tooth shape and at the same time, its upper surface is flatly formed and then, a mandrel is pressed into a cavity of the pipe. The mandrel has projected portions in a taper shape. The projected portions are connected with an inner peripheral side of the flat portion of the pipe so that the wall of the flat portion is overhung by flowing toward teeth of a mold frame in a plastic deformation way and an outer peripheral side of the flat portion of the pipe is provided with teeth in a straight line direction by a transfer method, the teeth in a straight line direction having a shape corresponding to the teeth of the mold frame, making it possible to manufacture the rack bar.

It has been known that the extent Ta to Tc of projected portions 204 to 206 mounted from a leading end 202 of a bar 201 of a mandrel 200 toward a base end 203 thereof is formed to be sequentially large from the pressed leading end 202 to the base end 203 as shown in FIG. 20 (for example, see Jpn. Pat. Appln. KOKAI Publication No. 2006-026703).

The aforementioned mandrel has problems as follows. That is, since the extent Ta to Tc of the projected portions 204 to 206 gradually increases, a large load is not applied to the mandrel 200 from the pipe in the press direction. On the other hand, the mandrel 200 passes in the press direction and is then slightly returned by a springback so that an inner diameter of the pipe is small. Therefore, when the mandrel 200 passes in a withdrawing direction, the projected portion 206 with maximum extent first contacts an inner wall surface of the pipe so that large load is applied to the mandrel, thereby applying excessive pressure to the mandrel 200. As a result, the case where the lifetime of the mandrel is shortened has become frequent.

Meanwhile, in order to prevent excessive load from being applied to the mandrel, if the extent of the projected portion 204 with the maximum extent of the mandrel 200 is small, the deformation due to the forging process per one time is reduced, thereby causing problems that the number of work processes is increased, kinds of required mandrels are increased, and processing efficiency is degraded.

Further, the rack bar is used for a rack and pinion gear 300 shown in FIG. 21. The rack and pinion gear 300 includes a casing 301, a pinion gear 303 rotatably mounted to the casing 301 through a bearing 302, a hollow rack bar 304 movably mounted to the pinion gear 303 in an orthogonal direction thereto, a rack guide 305 slidably supporting an outer wall surface (angle range M) of the hollow rack bar 304, and a spring 306 pressing the rack guide 305 to the pinion gear 303.

FIG. 22 is a cross-sectional view showing one example of a mandrel 400. The mandrel 400 includes a bar 401 and a projected portion 402 mounted to the bar 401. Also, a cross section of the bar 401 is a vertically long shape as shown in FIG. 22.

The aforementioned mandrel has problems as follows. That is, an outer peripheral surface of the hollow rack bar 304 should be formed at high precision so as to smooth the sliding of the rack guide 305.

To the contrary, a rear surface side of the projected portion 402 of the mandrel 400 is formed to have only a narrow angle range based on an axial direction of the mandrel 400. Therefore, effort and time to perform the processing, such as formation of the hollow rack bar 304 as an R shape in a subsequent process, is required.

Further, there is a case where the transfer forging is performed using a short type mandrel instead of a long type mandrel. Such a short type mandrel includes a separate driving bar so as to reciprocate the mandrel. In this case, the mandrel may be collapsed within the hollow portion of the hollow rack bar 304, making it impossible to mold the tooth.

Meanwhile, there is a problem that the lifetime of the mold frame used when transferring the teeth is shortened since stress is intensively applied to a center portion of the tooth bottom when transferring.

Also, such a mandrel is configured of a plurality of sets in which the extent of the projected portion gradually increases, and uses an optimal combination of the diameter, the material, the shape of a mold frame, etc. of the hollow rack bar.

The set of mandrels has problems as follows. That is, reaction force applied from the pipe to the mandrel makes the projected extent large. That is, since the projected extent becomes large on reaching the end of the processing, if the maximum projected extent of the next mandrel is set to be excessively large as compared to the maximum projected extent of a previous mandrel, a large load is required when pressing and the mandrel cannot be pressed due to an excess of capacity of a driving source.

Further, the mandrel passes in the pressing direction and is then slightly returned by the springback so that the inner diameter of the pipe is small. Therefore, when a next mandrel is pressed, the projected portion with the maximum extent first contacts the inner wall surface of the pipe so that large load is applied to the mandrel, thereby applying the excessive pressure to the mandrel. As a result, the case where the lifetime of the mandrel is shortened has become frequent.

Also, there is a case where the inner diameter of the pipe is small due to the occurrence of abnormality for any reasons when forming the flat portion. In this case, when a general mandrel is pressed, the mandrel is damaged.

A mandrel 300 used for the transfer forging includes a bar 301 and a projected portion 302 projected from the bar 301 as shown in FIG. 23. Also, the mandrel 300 is configured of a plurality of sets in which the extent of the projected portion 302 gradually increases as shown in a two-dot chain line in FIG. 23 and uses an optimal combination of the diameter, the material, the shape of the mold frame, etc. of the hollow rack bar.

The mandrel has problems as follows. That is, a maximum width W of the bar 301 of the mandrel 300 is identically set, irrespective of the extent of the projected portion 302. As a result, as the extent of the projected portion 302 becomes large, the molding load tends to be increased by pressing or sliding with respect to a predetermined width S1 of the inner wall surface in the transverse direction of the pipe P, as shown in FIG. 24. Also, if the width of the bar fluctuates due to an error in a manufacturing step, the molding load also fluctuates.

Therefore, there is a need for an apparatus generating large molding load in consideration of the fluctuation of molding load and there is a risk of increasing the cost of equipment.

BRIEF SUMMARY OF THE INVENTION

Therefore, it is an object of the present invention to provide a mandrel capable of extending its lifetime by preventing large load from being applied thereto without degrading processing efficiency.

According to the present invention, there is provided a mandrel used in a method of manufacturing a hollow rack bar by overhanging a wall of a hollow material from an inner diameter side toward a mold by pressing the mandrel into an inner cavity of the hollow material held to the mold, the mandrel comprising: a bar having a maximum cross section region smaller than a minimum cross section region of a hollow portion of the hollow material; and at least three projected portions mounted along an axial direction of the bar and including a maximum projected portion with maximum extent, wherein the maximum projected portion of the projected portions is positioned at a center side in an axial direction, the extent of the projected portion positioned at a leading end side in the axial direction of the bar is set to be smaller than the extent of the maximum projected portion positioned at a center side in the axial direction, and the extent of the projected portion positioned at a base end side in the axial direction of the bar is set to be less than or equal to the extent of the maximum projected portion.

According to the present invention, the lifetime can be extended by preventing the large load from being applied to the mandrel without degrading the processing efficiency.

Also, it is an object of the present invention to provide a mandrel capable of performing a smooth processing by forming a tooth simultaneously with making a rear surface side positioned opposing a tooth formation surface of a hollow material into an R shape and by preventing a short type mandrel from being collapsed within a hollow portion, and a hollow rack bar manufactured using the mandrel.

According to the present invention, there is provided a mandrel used in a method of manufacturing a hollow rack bar by overhanging a wall of a hollow material from an inner diameter side toward a mold by pressing the mandrel into an inner cavity of the hollow material held to the mold, the mandrel comprising: a bar having a maximum cross section region smaller than a minimum cross section region of a hollow portion of the hollow material; and a projected portion mounted to an axial direction of the bar and disposed at the mold side, wherein a rear surface portion positioned opposing the projected portion of the bar is provided with an outer peripheral pressing surface over a range corresponding to a sliding surface with a guide member for guiding the hollow rack bar from an outer peripheral surface side.

According to the present invention, there is provided a hollow rack bar comprising: a shaft portion in a hollow shape; a rack tooth forming portion mounted to the shaft portion and having a plurality of tooth portions engaged with a pinion gear and mounted along an axial direction in parallel; and a rear surface portion mounted opposing the rack tooth forming portion of the shaft portion and provided with a circumferential surface sliding with a guide member for guiding the shaft portion from an outer peripheral side.

According to the present invention, the smooth processing can be performed by forming the tooth simultaneously with making the rear surface side positioned opposing the tooth formation surface of the hollow material into the R shape and by preventing the short type mandrel from being collapsed within the hollow portion.

Also, it is an object of the present invention to provide a set of mandrels capable of preventing damage without making load required at the time of pressing extremely large.

According to the present invention, there is provided a set of mandrels having M mandrels from 1 to M used in a method of manufacturing a hollow rack bar by overhanging a wall of a hollow material from an inner diameter side toward a mold by pressing the mandrel into an inner cavity of the hollow material held to the mold, the mandrel comprising: a bar having a maximum cross section region smaller than a minimum cross section region of a hollow portion of the hollow material; and projected portions provided to be projected on the bar and set to make the maximum extent thereof gradually increase from 1 to M, wherein when N is an integer less than or equal to M, the maximum extent of the projected portion is set to make a difference between (N−1) and N smaller than a difference between (N−2) and (N−1).

According to the present invention, the damage can be prevented without making the load required at the time of pressing extremely large.

Also, it is an object of the present invention to provide a set of mandrels capable of suppressing a fluctuation of molding load required at the time of pressing and reducing the cost of equipment.

According to the present invention, there is provided a set of mandrels having M mandrels from 1 to M used in a method of manufacturing a hollow rack bar by overhanging a wall of a hollow material from an inner diameter side toward a mold by pressing the mandrel into an inner cavity of the hollow material held to the mold, the mandrel comprising: a bar having a maximum cross section region smaller than a minimum cross section region of a hollow portion of the hollow material; and projected portions provided to be projected on the bar and set to make the maximum extent thereof from 1 to M gradually increase and to make a maximum width thereof constant, wherein the bar has maximum width at its projected portion and its width is set to be gradually reduced toward a side opposing the mold.

According to the present invention, the damage can be prevented without making the load required at the time of pressing extremely large.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a view showing the hollow rack bar manufacturing apparatus using the mandrel, wherein it is a cross-sectional view showing a state where the mandrel is interposed around a mold and a mandrel holder;

DETAILED DESCRIPTION OF THE INVENTION

Figure 1:
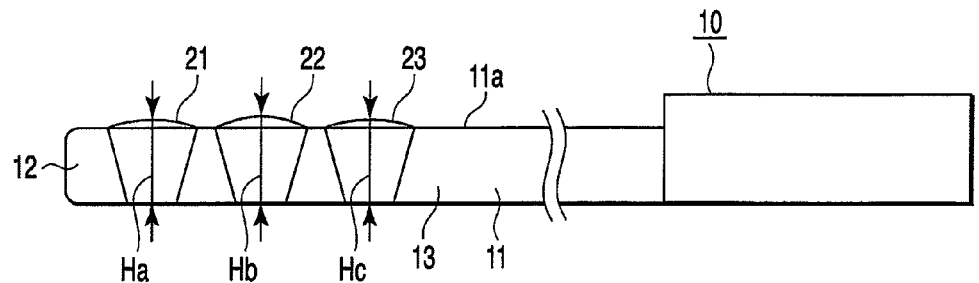
FIG. 1 is a side view showing main portions of a mandrel according to a first embodiment of the present invention.
Figure 2:
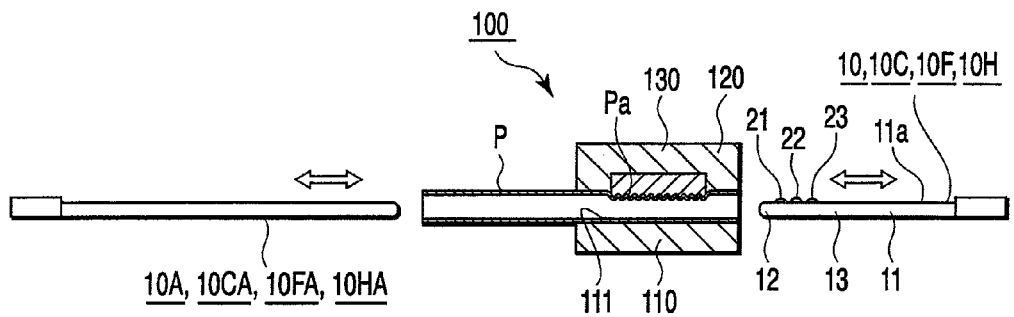
FIG. 2 is a cross-sectional view showing a hollow rack bar manufacturing apparatus to which the mandrel is applied.
Figure 21:
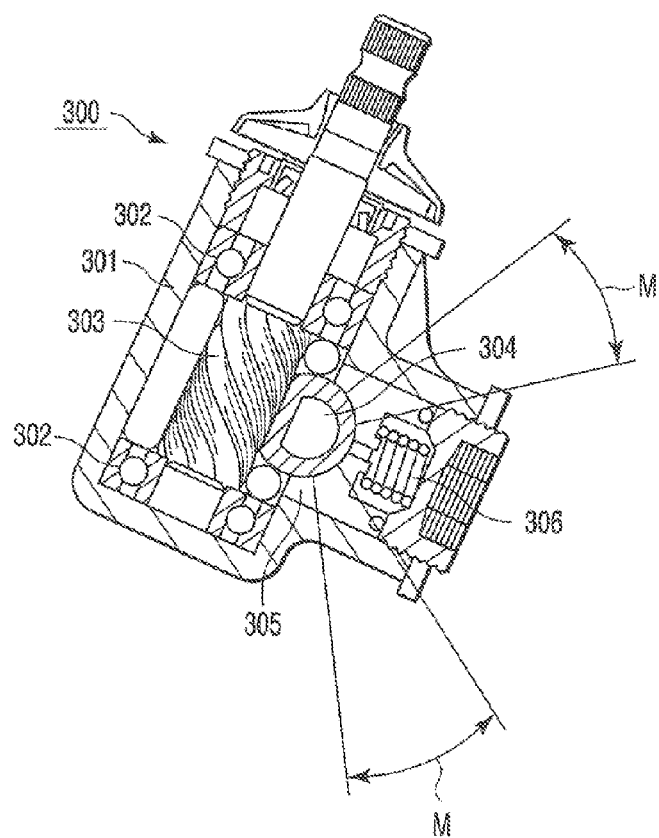
FIG. 21 is a cross-sectional view showing the main portions of a general rack and pinion gear.
Figure 22:
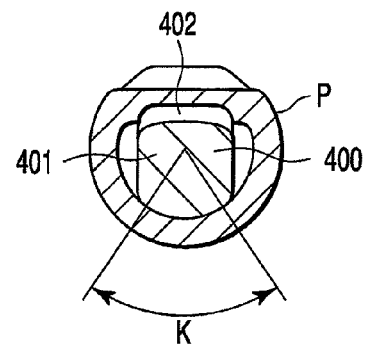
FIG. 22 is a cross-sectional view showing the hollow rack bar in a state where a general mandrel is pressed.
Figure 23:
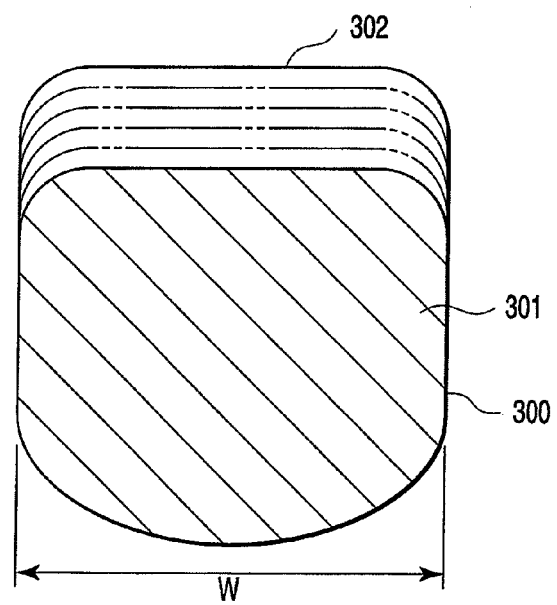
FIG. 23 is a cross-sectional view showing, by way of example, the main portions of a conventional mandrel.
Figure 24:
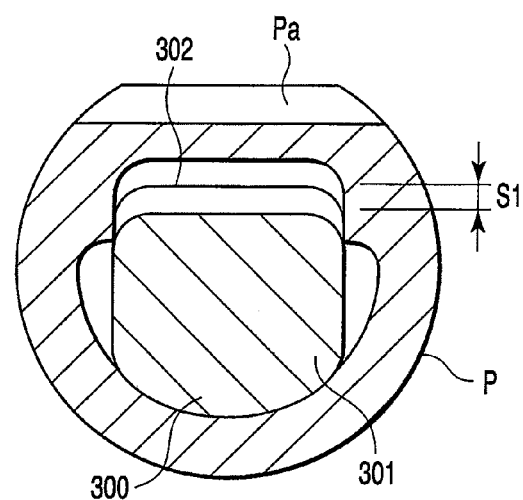
FIG. 24 is a cross-sectional view showing the main portions in a state where the mandrel is pressed into a pipe.

FIG. 1 is a side view showing a mandrel 10 according to a first embodiment of the present invention and FIG. 2 is a cross-sectional view showing main portions of a hollow rack bar manufacturing apparatus 100 using the mandrel 10. Also, in FIG. 2, P denotes a steel pipe (hollow material). The pipe P is used as a hollow rack bar of a rack and pinion gear and is slidably attached to a guide member (see FIG. 21) such as a rack guide 305. Further, in FIG. 2, 10A denotes a mandrel having the same configuration as the mandrel 10.

The mandrel 10 includes a semicircular bar 11. The bar 11 includes a leading end 12 in a pressing direction that is first pressed into the pipe P and a base end 13 connected to a driving apparatus.

An upper surface of the bar 11 is generally flat, but three projected portions 21, 22, 23 are mounted in one body along an axial direction of the bar. The bar 11 whose bottom surface side is closely attached to an inner peripheral surface of the pipe P can be linearly moved to the axial direction of the pipe P while maintaining the close attachment with the inner peripheral surface of the pipe P during a forging process. Also, it has a maximum cross section region smaller than a minimum cross section region of the hollow portion of the pipe P. In other words, as will be described below, it is largely formed so as to be smoothly moved even after an upper surface Pa of the pipe P is flattened.

Each projected portion 21 to 23 is provided with guide surfaces in a smooth taper shape and is configured to enable the mandrel 10 to be smoothly moved irrespective of flow resistance when molding. The maximum extent of the three projected portions 21 to 23, respectively, is Ha, Hb, Hc, wherein the height relation thereof is as follows:

Ha<Hb, Hb≧Hc

In other words, the projected portion 22 positioned at a center side in the axial direction is a maximum projected portion, wherein the maximum extent Hb thereof is optimally selected depending on material, processing temperature, fixture exchange cost, processing time, or the like of the pipe P or the mandrel 10. Further, the maximum extent Ha, Hc of the projected portions 21, 23, respectively, is set to be able to perform proper overhang in consideration of springback since the springback is generated in the pipe P after the mandrel 10 is pressed and withdrawn.

Hereinafter, a configuration of the hollow rack bar manufacturing apparatus 100 using the mandrel 10 will be described. The hollow rack bar manufacturing apparatus 100 includes a lower frame 110 and an upper frame 120 holding the pipe P. The hollow rack bar manufacturing apparatus 110 presses the mandrel 10 into a cavity inside the pipe P held by the lower frame 110 and the upper frame 120 so that a wall of the pipe P is overhung from its inner diameter side toward a tooth frame 130 to be described below, thereby manufacturing the hollow rack bar.

The lower frame 110 includes a semicircular inner peripheral surface 111 in its cross section, wherein on the semicircular inner peripheral surface 111 is disposed the pipe P. The upper frame 120 whose inner surface of an upper side is detachably provided with the tooth frame 130 having a gap in a length direction over a predetermined length can form a rack meeting a prominence and depression of the tooth frame 130 in a portion with a predetermined length in the upper surface of the pipe P by a transfer forging.

The forging processing of the pipe P is performed using the thus configured hollow rack bar manufacturing apparatus 100 and the mandrels 10, 10A.

The center portion of the pipe is previously flattened in a concave shape by a separate frame so that the pipe P where concave shape is a semicircular shape is prepared. The pipe P is held between the upper frame 120 and the lower frame 110 so that the upper surface Pa of the pipe P contacts the tooth frame 130.

In this state, the press of the mandrel 10 to the pipe P is initiated. The mandrel 10 is guided into the hollow portion of the pipe P from its leading end 12. The first projected portion 21 acts to the upper surface Pa of the pipe P through the guide surface in the taper shape so that the wall of the pipe P is overhung toward a tooth shape of the tooth frame 130. Then, the press of the mandrel 10 is continued so that the overhang of the wall by sequential projected proportions 22, 23 is experienced, thereby performing a press forging.

Next, the mandrel 10 moves to the withdrawing direction. The upper surface Pa generates the springback within a slight time until the mandrel 10 passes in the press direction and the mandrel 10 begins to move to the withdrawing direction so that its inner diameter becomes small. At this time, the projected portion 23 first acts on the upper surface Pa of the pipe P. Meanwhile, since the projected portion 23 is set to be less than or equal to the maximum extent of the projected portion 22, the load generated by the action of the projected portion 23 and the pipe P is not large. Subsequently, the projected portion 22 acts on the upper surface Pa of the pipe P to widen the upper surface Pa.

Also, when the mandrel 10 is withdrawn, the mandrel 10A is pressed so that the press forging is alternately performed.

Thereby, the press and withdrawal of the mandrels 10, 10A is performed so that the press forging is performed. Likewise, the press forging is performed using the mandrel 10 wherein the extent of the projected portion is large. Thereafter, likewise with the foregoing, the predetermined processes are repeated while making the size of the mandrel 10 gradually increase so that the final processing is completed. Finally, the wall of pipe P is sufficiently overhung corresponding to the prominence and depression of the tooth frame 130 due to the height of the mandrel 10 by pressing of the mandrel, completing transfer forging of the rack.

As described above, with the mandrel 10 according to the present embodiment, since the maximum extent Hc of the first projected portion 23 is set to be less than or equal to the maximum extent Hb of the projected portion 22, which is the maximum projected portion, when withdrawing, the mandrel 10 is not subjected to excess load from the pipe P corresponding to a reduction of the inner diameter of the pipe P due to the springback. Accordingly, the load applied to the mandrel 10 can be small and the maximum projected extent can be large, making it possible to reduce the number of mandrels to be used, shorten the fixture exchange cost and processing time, and reduce the processing cost.

Also, the number of projected portions is not limited to three, but the same effects can also be obtained by four or more projected portions. In the case of using the four projected portions, each maximum extent Ha to Hd is as follows:

$Ha<Hb<Hc \geqq Hd$

In other words, at least four projected portions mounted along the axial direction of the mandrel 10 and including the maximum projected portion having the maximum extent are provided, their extents are set to gradually increase from the projected portion positioned at the leading end side in the axial direction of the mandrel 10 to the maximum projected portion positioned second from the base end side in the axial direction, and the extent of the projected portion positioned at the base end side in the axial direction of the mandrel 10 is set to be less than or equal to the extent of the maximum projected portion.

Also, in the case of using five projected portions, each maximum extent Ha to He is as follows:

$Ha<Hb<Hc<Hd \geqq He$ or, $Ha<Hb<Hc \geqq Hd \geqq He$

In other words, at least five projected portions mounted along the axial direction of the mandrel 10 and including the maximum projected portion having the maximum extent are provided, their extents are set to gradually increase from the projected portion positioned at the leading end side in the axial direction of the mandrel 10 to the maximum projected portion positioned third from the base end side in the axial direction thereof, the extent of the projected portion positioned second from the base end side in the axial direction is set to be less than or equal to the extent of the maximum projected portion, and the extent of the projected portion positioned at the base end side in the axial direction of the mandrel 10 is set to be less than or equal to the extent of the projected portion positioned second from the base end side in the axial direction.

Six or more projected portions are like the foregoing.

Figure 3:
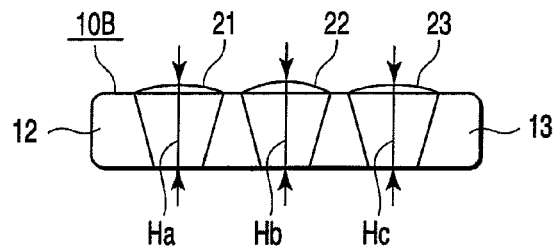
FIG. 3 is a side view showing a modification example of the mandrel.

FIG. 3 is a side view showing a short type mandrel 10B that is a modification example of the mandrel 10 according to the present invention. In FIG. 3, portions having the same functions as FIG. 1 are denoted by the same numbers and the detailed description thereof will be omitted.

The short type mandrel 10B is configured of the mandrel 10B and a driving bar for reciprocating the mandrel 10B, separately.

Figure 5:
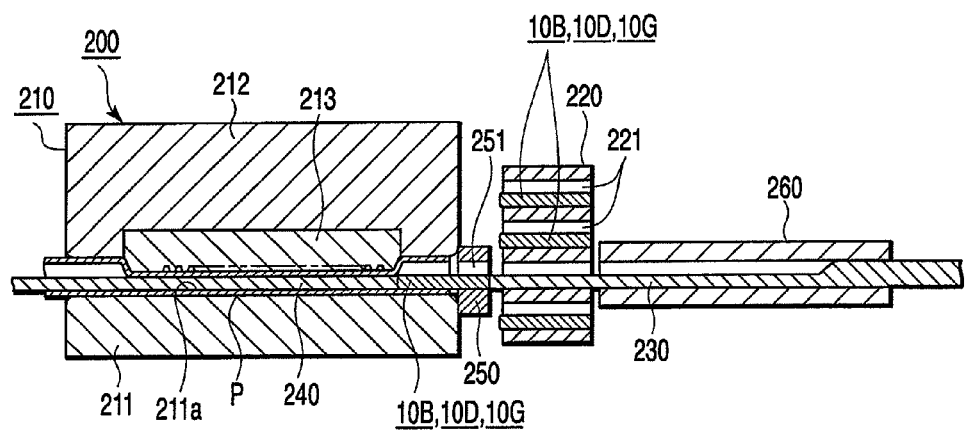
FIG. 5 is a cross-sectional view showing a state where the mandrel is delivered around the mold and the mandrel holder of the hollow rack bar manufacturing apparatus.
Figure 6:
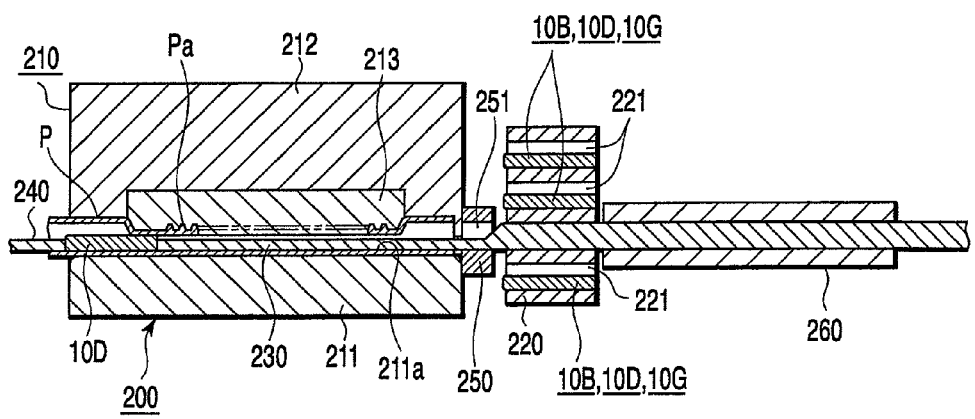
FIG. 6 is a cross-sectional view showing a state where the pressing of the mandrel around the mold and the mandrel holder of the hollow rack bar manufacturing apparatus is completed.

FIGS. 4 to 6 show a hollow rack bar manufacturing apparatus 200 using the mandrel 10B. FIG. 4 is a view showing a state where the mandrel is interposed around a mold and a mandrel holder; FIG. 5 is a view showing a state where the mandrel is pressed and withdrawn around the mold and mandrel holder of the hollow rack bar manufacturing apparatus; and FIG. 6 is a view showing a state where the press of the mandrel around the mold and mandrel holder is completed. In FIGS. 5 and 6, portions having the same functions as FIG. 4 are denoted by the same numbers and the detailed description thereof will be omitted.

A length of the bar 11 of the mandrel 10B is shortly set to be a half or less of a length of a tooth portion of a tooth frame 213 to be described later.

The hollow rack bar manufacturing apparatus 200 includes a mold 210, a mandrel holder 220 receiving a set of plural mandrels 10B, a first mandrel pressing bar 230, a second mandrel pressing bar 240, a mandrel guide 250, etc.

The mold 210 includes a lower frame 211 and an upper frame 212 holding the pipe P. The lower frame 211 includes a semicircular inner peripheral surface 211a in its cross section, wherein on the semicircular inner peripheral surface 211a is disposed the pipe P. The upper frame 212 whose inner surface of an upper side is detachably provided with the tooth frame 213 having a gap in a length direction over a predetermined length can form a rack meeting a prominence and depression of the tooth frame 213 in a portion with a predetermined length in the upper surface of the pipe P by the transfer forging.

The mandrel holder 220 is disposed at one side of the mold 210, for example, only at the right of the mold 210 in FIGS. 4 to 6. As shown in FIGS. 4 to 6, the mandrel holder 220 has a plurality of holding apertures 221. These holding apertures 221 penetrate through the mandrel holder 220 in a direction where the pipe P is extended and the mandrel 10B is received in the inside of the holding apertures, respectively. The received mandrel 10B assumes a proper posture with respect to the mold and is held by a plate spring (not shown), etc so as not to be inadvertently separated therefrom. The mandrel 10B supported to the mandrel holder 220 is positioned at a side where the first mandrel pressing bar 230 is pressed and removed into and from the mold 210.

The mandrel holder 220 moves by the holder driving portion (not shown). When the driving is performed, one of the plurality of holding apertures 211 is sequentially selected so that it is opposite to one end of the pipe P combined with each other. Therefore, it is possible to sequentially press and withdraw the mandrels 10B supported to the mandrel holder 220 into and from the pipe P. As a result, the mandrel holder 220 moves by a constant pitch in an up and down direction (vertical direction) in FIGS. 4 to 6 by the holder driving portion. However, it may be instead moved in a horizontal direction (surface and rear directions shown in FIGS. 4 to 6). Also, the mandrel holder 220 is rotatably mounted so that it can be rotated by a predetermined angle by the holder driving portion.

The leading end side of the first mandrel pressing bar 230 is removably formed with respect to the pipe P held to the mold 210. At this time, it is inserted into the pipe P held to the mold 210 along the mandrel 10B. Also, a number 260 in FIGS. 4 to 6 denotes a pressure bar guide in a pipe shape.

The leading end side of the second mandrel pressing bar 240 is removably formed with respect to the pipe P held to the mold 210.

As shown in FIGS. 4 to 6, the mandrel guide 250 is disposed between the mold 210 and the mandrel holder 220 and near the mold 210. The mandrel guide 250 is made of metal, etc. and has a hole 251 penetrated in its thickness direction. The hole 251 is communicated with the hollow portion of the pipe P held to the mold 210.

Next, a procedure for manufacturing the hollow rack bar using the hollow rack bar manufacturing apparatus 200 having the aforementioned configuration will be described. The set pipe P is disposed inside the mold 210 and the other end side of the pipe P is projected from the mold 210. Also, it is interposed between the lower frame 211 and the upper frame 211 by a clamp and the tooth frame 213 contacts the flat portion Pa.

Before or after the set work, the mandrel holder 220 is operated to hold one of the plurality of mandrels 10B received therein in the state opposing the hole 251 of the mandrel guide 250. Furthermore, the leading end of the first mandrel pressing bar 230 is connected with a right end of the mandrel 10B opposing the hole 251.

Next, the second mandrel pressing bar 240 is inserted into the pipe P and the leading end of the second mandrel pressing bar 240 is inserted through the pipe P and the hole 251 of the mandrel guide 250 so that it contacts a left end of the mandrel 10B in the mandrel holder 220 opposing the hole 251. Therefore, the mandrel 10B in the hole 251 is interposed between the first mandrel pressing bar 230 and the second mandrel pressing bar 240 contacting both ends thereof from the both ends in the axial direction thereof.

Thereafter, the first mandrel pressing bar 230 is inserted into the pipe P held to the mold 210 through the holding aperture 221 of the mandrel holder 220 and the hole 251 of the mandrel guide 250, as shown in FIG. 5.

At this time, the mandrel 10B is pressed by the first mandrel pressing bar 230 to be inserted into the pipe P, in a state where the mandrel 10B is interposed between the first mandrel pressing bar 230 and the second mandrel pressing bar 240. By this press, the overhang of the wall by the projected portions 21 to 23 of the mandrel 10B is experienced so that the press forging is performed. The press of the mandrel 10B is completed in a state where the mandrel 10B is not separated from the processing wall portion as shown in FIG. 6.

Next, the first mandrel pressing bar 230 is returned. At this time, the second mandrel pressing bar 240 moves toward the mandrel holder 220. Thereby, the mandrel 10B is pressed by the second mandrel pressing bar 240 and pushed back into the mandrel holder 220 through the pipe P and the hole 251 of the mandrel guide 250 in a state where the mandrel 10B is interposed between the first mandrel pressing bar 230 and the second mandrel pressing bar 240 contacting both ends thereof. Even in this case, the overhang of the wall by the projected portions 21 to 23 of the mandrel 10B is experienced so that the press forging is performed.

Thereafter, the mandrel holder 220 moves so that the mandrel 10B of which the extent of the projected portion is large and the holding aperture 221 receiving it are opposite to an opening portion of the pipe P through the hole 251 of the mandrel guide 250.

After the subsequently used mandrel 10B is made in the interposed state, the mandrel 10B is pressed by the first mandrel pressing bar 230 to be pressed into the pipe P in a state where the mandrel 10B is interposed between the first mandrel pressing bar 230 and the second mandrel pressing bar 240 as described above so that it is reciprocated once. The hollow rack bar having the rack corresponding to the tooth frame 213 of the mold 210 of the pipe P is manufactured by sequentially repeating the procedure.

Finally, after the last used mandrel 10B is returned to the mandrel holder 220, the second mandrel pressing bar 240 is extracted from the pipe P and the mold 210 is then opened.

Even in the case of using the short type mandrel 10B, the same effects as the mandrel 10 can be obtained.

Figure 7:
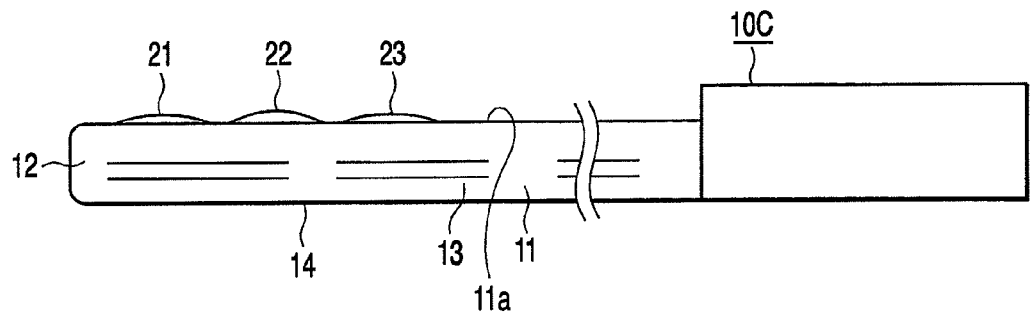
FIG. 7 is a side view showing main portions of a mandrel according to a second embodiment of the present invention.
Figure 8:
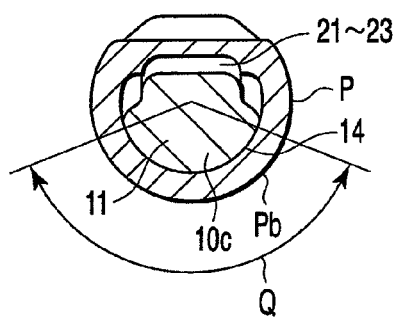
FIG. 8 is a cross-sectional view showing a hollow rack bar in which the mandrel is pressed.

FIG. 7 is a side view showing a mandrel 10C according to a second embodiment of the present invention. In FIG. 7, portions having the same functions as FIG. 1 are denoted by the same numbers and the detailed description thereof will be omitted.

The mandrel 10C includes the semicircular bar 11. The bar 11 includes a leading end 12 positioned at a leading edge side in a press direction that is first inserted into the pipe P and a base end 13 connected to a driving apparatus.

The upper surface of the bar 11 is generally flat, but the bar 11 is provided with a flat portion 11a on which the three projected portions 21, 22, 23 are mounted in one body along an axial direction of the bar. Meanwhile, the bar 11 is closely attached to the inner peripheral surface of the pipe P in the rear surface side positioned opposing to the flat portion 11a and can be linearly moved to the axial direction of the pipe P while maintaining the close attachment with the inner peripheral surface of the pipe P during a forging process. Also, it has the maximum cross section region smaller than the minimum cross section region of the hollow portion of the pipe P. In other words, as will be described below, it is largely formed so as to be smoothly moved even after an upper surface of the pipe P is flattened and the flat portion Pa is formed. The rear surface side positioned opposing the projected portions 21 to 23 of the bar 11 is provided with an outer peripheral pressing surface 14 over a range Q (120 to 150° centering on the axis) corresponding to a sliding surface with the guide member for guiding from the outer peripheral surface side when the pipe P is used as the hollow rack bar.

Each projected portion 21 to 23 is provided with the guide surfaces in a smooth taper shape and is configured to enable the mandrel 10C to be smoothly moved irrespective of the flow resistance when molding.

Figure 12:
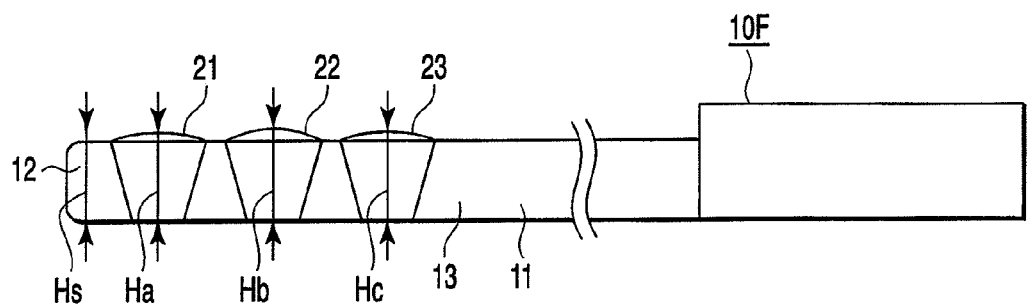
FIG. 12 is a side view showing main portions of one mandrel of a set of mandrels according to a third embodiment of the present invention.

The mandrel 10C is used for the hollow rack bar manufacturing apparatus 100 likewise the aforementioned mandrel 10. The forging processing is performed on the pipe P using the thus configured hollow rack bar manufacturing apparatus 100 and the mandrel 10C (see FIG. 2). In FIG. 12, 10CA denotes a mandrel having the same configuration as the mandrel 10C.

The center portion of the pipe is previously flattened in a concave shape by a separate frame so that the pipe P where concave shape is a semicircular shape is prepared. The pipe P is held between the upper frame 120 and the lower frame 110 so that the flat portion Pa of the pipe P contacts the tooth frame 130.

In this state, the press of the mandrel 10C to the pipe P is initiated. The mandrel 10C is guided into the hollow portion of the pipe P from its leading end 12. Then, the first projected portion 21 acts on the inner surface side of the flat portion Pa of the pipe P through the guide surface in the taper shape so that the wall of the pipe P is overhung toward a tooth shape of the tooth frame 130. Then, the pressing of the mandrel 10C is continued so that the overhang of the wall by sequential projected proportions 22, 23 is experienced, thereby alternately performing an press forging. Next, the mandrel 10C moves to the withdrawing direction. Subsequently, the mandrel 10CA is pressed so that the press forging is performed. At this time, since the mandrels 10, 10CA are provided with the outer peripheral pressing surface 14, the surface of the lower side of the pipe P is made in the an R shape.

Thereafter, the press forging is performed using the mandrel 10C of which the extent of the projected portion is slightly large, likewise the foregoing. Then, likewise with the foregoing, the predetermined processes are repeated while making the size of the mandrel 10 gradually increase so that the final processing is completed. Finally, the wall of pipe P is sufficiently overhung corresponding to the prominence and depression of the tooth frame 130 due to the height of the mandrel 10 by pressing of the mandrel, completing transfer forging of the rack.

As described above, with the mandrel 10C according to the present embodiment, the flat portion Pa of the pipe P can be made in the tooth shape and at the same time, the rear surface portion Pb thereof can be made in the R shape by the outer peripheral pressing surface 14. Therefore, the process for forming the R shape in a subsequent process is not needed so that the effort and time of the processing can be reduced. If the R shape is formed, in the case where the pipe P is used as the hollow rack bar, when it is incorporated in the rack and pinion gear, the sliding with the guide member is smoothly performed, making it possible to smoothly perform the movement in the axial direction by the guide member.

Figure 9:
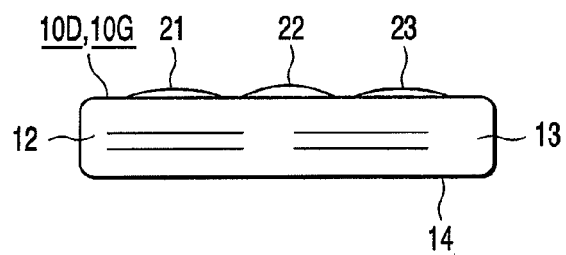
FIG. 9 is a side view showing a modification example of the mandrel.

FIG. 9 is a side view showing one short type mandrel 10D of the set of mandrels according to a modification example of the aforementioned mandrel 10C. Also, in FIG. 9, portions having the same functions as FIG. 3 are denoted by the same numbers and the detailed description thereof will be omitted.

The mandrel 10D manufactures the hollow rack bar using the aforementioned hollow rack bar manufacturing apparatus 200, likewise with the mandrel 10B. Even in the case of using the short type mandrel 10D, the same effects as the mandrel 10C can be obtained.

Figure 10:
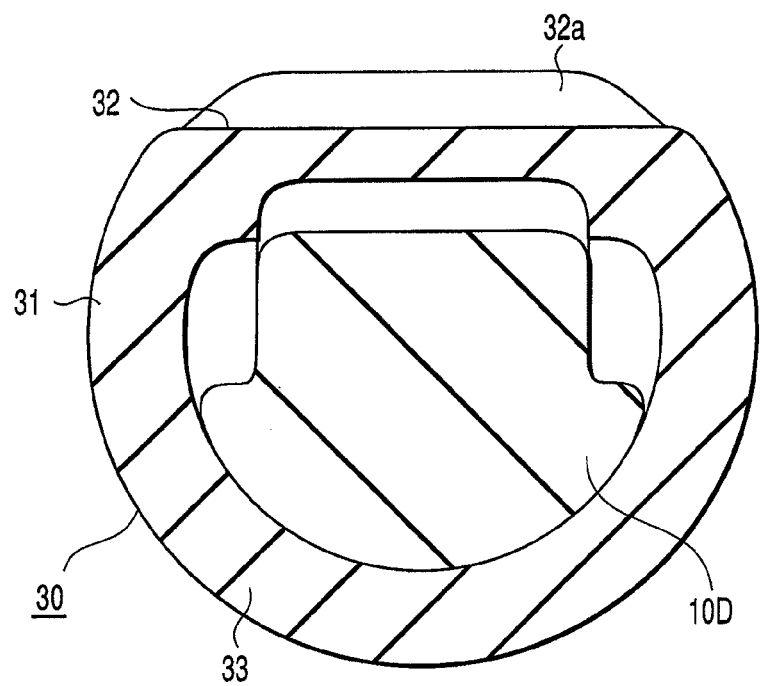
FIG. 10 is a cross-sectional view showing one example of the hollow rack bar manufactured by the hollow rack bar manufacturing apparatus.

FIG. 10 is a cross-sectional view showing the aforementioned mandrel 10D and a hollow rack bar 30 manufactured by the hollow rack bar manufacturing apparatus 200.

The hollow rack bar 30 includes a shaft portion 31 in a hollow shape, a rack tooth forming portion 32 mounted to the shaft portion 31 and having a plurality of tooth portions engaged with a pinion gear 303 and mounted along an axial direction in parallel, and a rear surface portion 33 mounted to a side opposing the rack tooth forming portion 32 of the shaft portion 31 and provided with a circumferential surface sliding with the rack guide (guide member) 305 for guiding the shaft 31 from the outer peripheral side. The circumferential surface corresponds to the aforementioned R shape. Also, in FIG. 10, 32a denotes the tooth portion.

As described above, with the hollow rack bar 30, the circumferential surface is formed in the same shape as the tooth shape. Accordingly, when the hollow rack bar 30 is incorporated in the rack and pinion gear 300, the sliding with the rack guide 305 is smoothly performed so that the movement in the axial direction can be smoothly performed by the rack guide 305.

Figure 11:
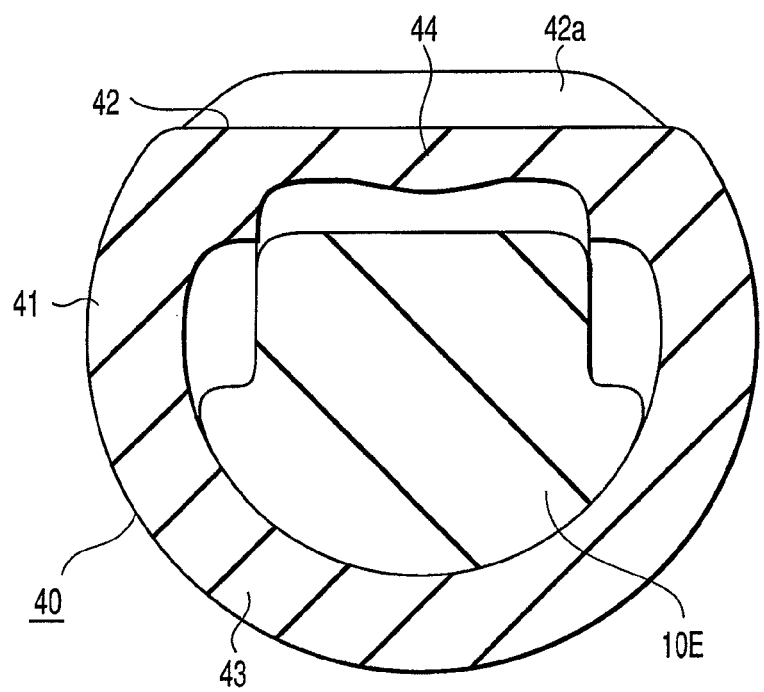
FIG. 11 is a cross-sectional view showing another example of the hollow rack bar manufactured by the hollow rack bar manufacturing apparatus.

FIG. 11 is a cross-sectional view showing a mandrel 10E and a hollow rack bar 40 manufactured by the hollow rack bar manufacturing apparatus 200.

The hollow rack bar 40 includes a shaft portion 41 in a hollow shape, a rack tooth forming portion 42 mounted to the shaft portion 41 and having a plurality of tooth portions engaged with the pinion gear 303 and mounted along an axial direction in parallel, and a rear surface portion 43 mounted to a side opposing the rack tooth forming portion 42 of the shaft portion 41 and provided with a circumferential surface sliding with the rack guide (guide member) 305 for guiding the shaft 41 from the outer peripheral side. The circumferential surface corresponds to the aforementioned R shape. Also, in FIG. 11, 42a denotes the tooth portion.

On the other hand, the hollow rack bar 40 has a convex portion 44 formed at a center portion in a direction intersecting the axial direction of the shaft portion 41, on the inner surface side of the rack tooth forming portion 42 of the shaft portion 41. The convex portion 44 is mounted at a position opposing the center portion of the tooth bottom of the mold frame.

As described above, with the hollow rack bar 40, the same effects as the hollow rack bar 30 can be obtained and at the same time, since the convex portion 44 is formed, the stress is not concentrated on the center portion of the tooth bottom of the mold frame when transferring the shape of the mold frame by the mandrel 10E and the lifetime can be extended as compared to the case of manufacturing the hollow rack bar 30 without applying the load to the mold frame.

FIG. 12 is a side view showing one mandrel 10F of the set of mandrels (set of mandrels) according to a third embodiment of the present invention. Also, in FIG. 12, portions having the same functions as FIG. 1 are denoted by the same numbers and the detailed description thereof will be omitted. In FIG. 2, 10FA denotes a mandrel having the same configuration as the mandrel 10c.

The mandrel 10F includes the semicircular bar 11. The bar 11 includes the leading end 12 in the pressing direction that is first inserted into the pipe P and the base end 13 connected to the driving apparatus.

An upper surface of the bar 11 is generally flat, but the three projected portions 21, 22, 23 are mounted in one body along an axial direction of the bar 11. The bar 11 whose bottom surface side is closely attached to the inner peripheral surface of the pipe P can be linearly moved to the axial direction of the pipe P while maintaining the close attachment with the inner peripheral surface of the pipe P during the forging process. Also, it has the maximum cross section region smaller than the minimum cross section region of the hollow portion of the pipe P. In other words, as will be described below, it is largely formed so as to be smoothly moved even after the flat portion Pa of the pipe P is flattened.

Each projected portion 21 to 23 is provided with the guide surfaces in the smooth taper shape and is configured to enable the mandrel 10 to be smoothly moved irrespective of the flow resistance when molding. The maximum extent of the three projected portions 21 to 23, respectively, is Ha, Hb, Hc, wherein the height relation thereof is as follows:

Ha<Hb, Hb>Hc

In other words, the projected portion 22 positioned at the center side in the axial direction is a maximum projected portion, wherein the maximum extent Hb thereof is optimally selected depending on material, processing temperature, fixture exchange cost, processing time, or the like of the pipe P or the mandrel 10F. Further, the extent Ha, Hc of the projected portions 21, 23, respectively, is set to be able to perform the proper overhang in consideration of the springback since the springback is generated in the pipe P after the mandrel 10 is pressed and withdrawn.

Figure 13:
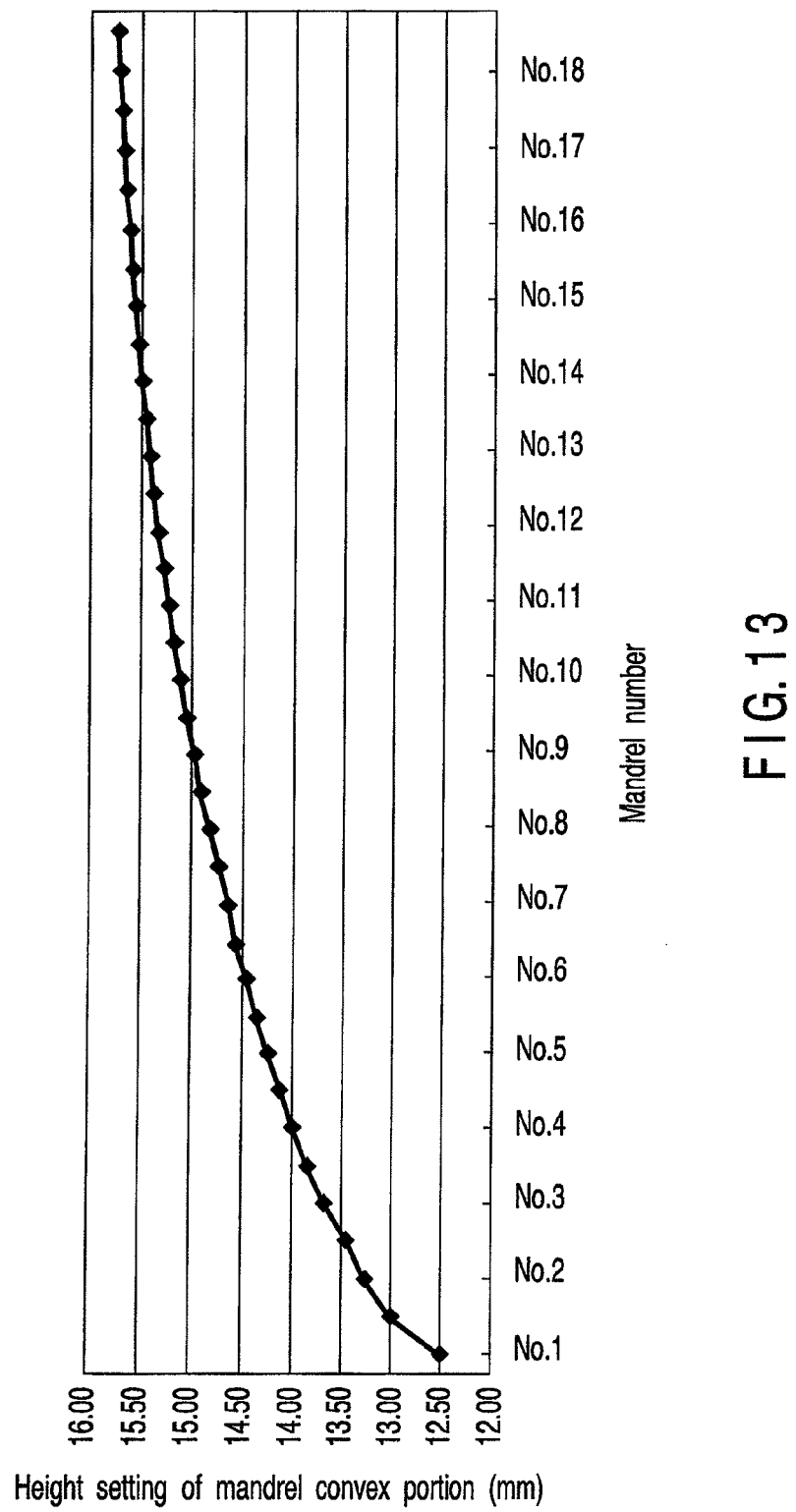
FIG. 13 is a graph showing a setting value of the maximum projected extent of the set of mandrels.

The extent of the projected portion 22, that is, the maximum projected extent of the mandrel 10F is set as shown in FIG. 13. In other words, the maximum extent thereof is set to gradually increase from 1 to m and at the same time, when N is set to an integer less than or equal to M, the maximum extent is the difference between (N–2) and (N–1), wherein the difference between (N–1) and N is set to be smaller. In other words, the maximum extent thereof increases from 1 to M, but the difference thereof gradually decreases.

On the other hand, the height Hs of the leading end of the bar 11 of the mandrel 10F is set to be smaller than the maximum extent of the projected portion 22 of the previous mandrel 10F. However, the projected portion 21 is set to be larger than the maximum extent of the projected portion 22 of the previous mandrel 10F. Further, the maximum extent of 1 is set to be sufficiently smaller than the inner diameter of the pipe P.

Next, the forging processing is performed using the mandrels 10F, 10FA and the aforementioned hollow rack bar manufacturing apparatus 100 (see FIG. 12).

The center portion of the pipe P is previously flattened in a concave shape by a separate frame so that the flat portion Pa where concave shape is a semicircular shape is formed. The pipe P is held between the upper frame 120 and the lower frame 110 so that the flat portion Pa of the pipe P contacts the tooth frame 130.

In this state, the press of the mandrel 10F to the pipe P is initiated. The mandrel 10F is guided into the hollow portion of the pipe P from its leading end 12. Then, the first projected portion 21 acts on the inner surface of the flat portion Pa of the pipe P through the guide surface in the taper shape so that the wall of the pipe P is overhung toward a tooth shape of the tooth frame 130. Then, the press of the mandrel 10 is continued so that the overhang of the wall by sequential projected proportions 22, 23 is experienced, thereby performing the press forging.

Next, the mandrel 10F moves to the withdrawing direction and the mandrel 10FA is pressed so that the press forging is alternately performed.

Thereby, the press and withdrawal of the mandrels 10F, 10FA is performed so that the press forging is performed. Next, the press and withdraw of next mandrels 10F, 10FA is performed. Thereafter, likewise with the foregoing, the predetermined processes are repeated while making the number of the mandrel 10F large by one so that the final processing is completed. Finally, the wall of the pipe P is sufficiently overhung corresponding to the prominence and depression of the tooth frame 130 due to the height of the mandrel 10F by pressing of the mandrel, completing transfer forging of the rack.

Figure 14:
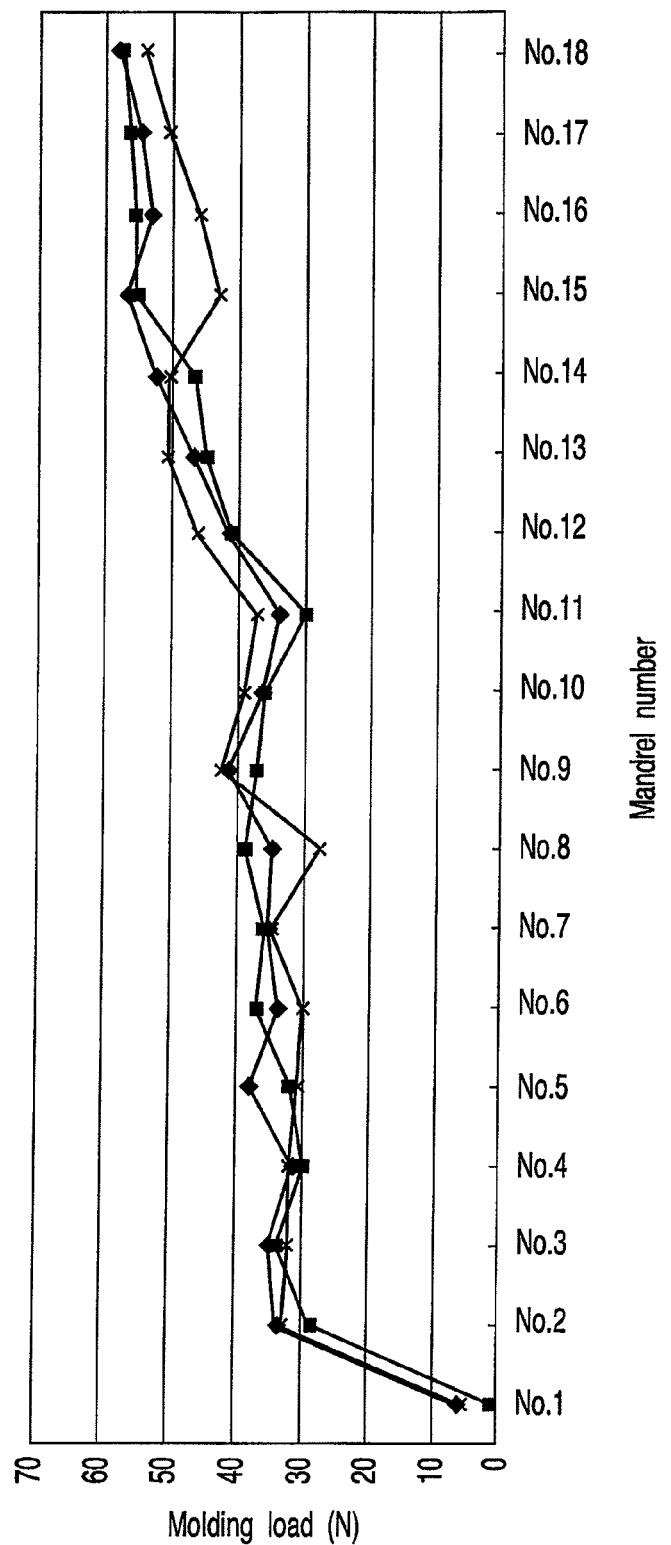
FIG. 14 is a graph showing a change in load in the case of using the set of mandrels.

As described above, the maximum extent of the projected portion 22 increases from 1 to M, but the difference thereof is set to gradually decrease. Therefore, as shown in FIG. 14, even though the transfer forging reaches the end, the required load for pressing the mandrel 10F is not suddenly increased. Accordingly, the problems that the press of the mandrel 10F is performed in excess of the capacity of the driving source and the lifetime of the mandrel 10F is shortened due to the excessive reaction force do not occur.

On the other hand, the extent of the projected portions 21, 23 of the mandrel 10F is set to be smaller than the maximum extent of the projected portion 22 of the previous mandrel 10F. Thus, even in the case where in the transfer forging performed in the previous mandrel 10F the inner diameter of the flat portion Pa is small by the springback, even when the projected portions 21, 23 of a next mandrel 10F collide against the inner diameter side of the pipe P, it is not subjected to the excessive reaction force. Therefore, the excessive load is not applied to the mandrel 10F so that the problem that the lifetime of the mandrel 10F is shortened does not occur.

Further, the height Hs of the leading end of the bar 11 of the mandrel 10F having number 1 is set to be sufficiently smaller than the inner diameter of the pipe P and to be equal to the minimum cross section region. Thus, even though the inner diameter of the flat portion Pa is abnormally small for any factors when forming the flat portion Pa, it is possible to press the mandrel 10F and to continuously perform the transfer forging. Also, in the case where the flat portion Pa of the pipe P is formed as set, the number 1 mandrel 10F does not collide against the inner diameter side of the flat portion Pa and there is little load applied thereto.

Figure 15:
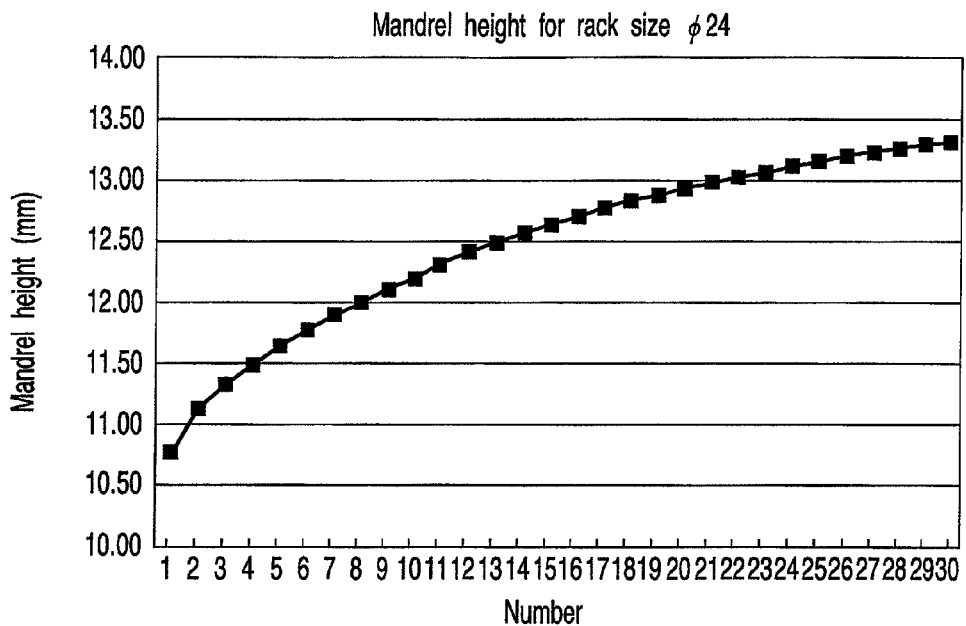
FIG. 15 is a graph showing a setting value of the maximum projected extent of another set of mandrels.
Figure 16:
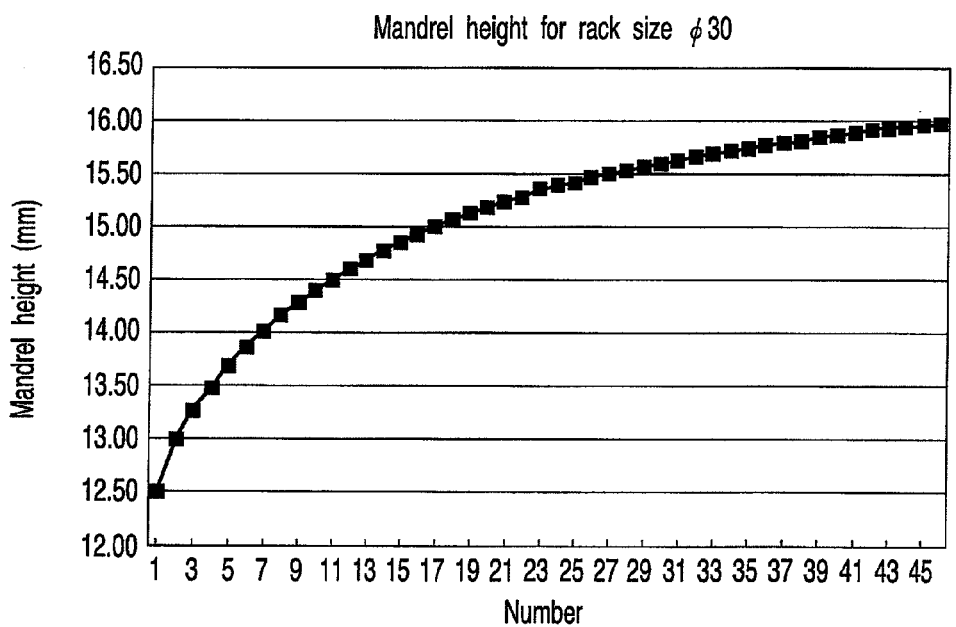
FIG. 16 is a graph showing a setting value of the maximum projected extent of another set of mandrels.

FIGS. 15 and 16 are graphs showing one example of setting values of the maximum projected extent of the mandrels 10F of each number in the case where the inner diameter of the pipe P is different.

As described above, with the set of mandrels according to the present embodiment, since the required load for performing the press is not extremely large even when the transfer forging reaches the end, it is possible to make the capacity of the driving apparatus small and reduce the apparatus cost or the production cost. At the same time, a large press machine applying the load to the lower frame 110 and the upper frame 120 is not needed so that the apparatus cost or the production cost can be reduced.

Also, when using a next mandrel 10F, the excessive pressure due to the spring back is not applied so that the damage of the mandrel 10F can be prevented. Further, even though the inner diameter of the flat portion Pa is abnormally small for any factors when forming the flat portion Pa, the transfer forging can be continuously performed. Also, the smooth production can be made without damaging the equipment.

FIG. 9 is a side view showing a short type mandrel 10D which is one of the set of mandrels according to a modification example of the aforementioned mandrel 10C. Also, in FIG. 9, portions having the same functions as FIG. 3 are denoted by the same numbers and the detailed description thereof will be omitted.

A configuration of the mandrel 10F may be applied to a short type mandrel 10G (see FIG. 6) and may also be used for the hollow rack bar manufacturing apparatus 200. Also, the length of the bar 11 of the mandrel 10G is shortly set to a half or less of the length of the tooth portion of the tooth frame 213 to be described later.

The mandrel 10G manufactures the hollow rack bar using the aforementioned hollow rack bar manufacturing apparatus 200, likewise with the mandrel 10B. Even in the case of using the short type mandrel 10Q, the same effects as the mandrel 10F can be obtained.

Figure 17:
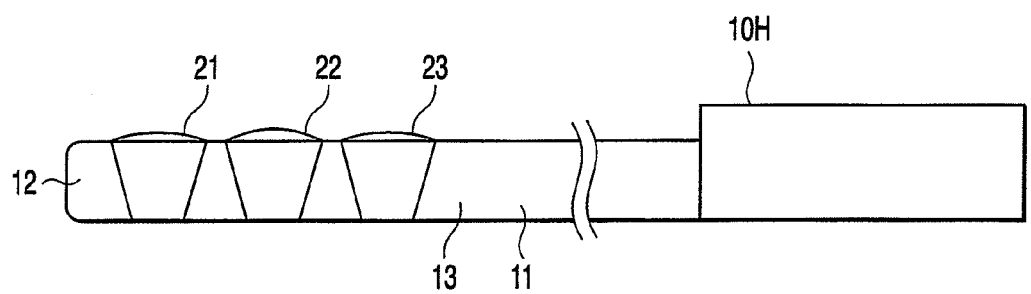
FIG. 17 is a side view showing the main portions of one mandrel of a set of mandrels according to a fourth embodiment of the present invention.

FIG. 17 is a side view showing one mandrel 10H of the set of mandrels according to a fourth embodiment of the present invention. Also, in FIG. 17, portions having the same functions as FIG. 1 are denoted by the same numbers and the detailed description thereof will be omitted.

The mandrel 10H includes the semicircular bar 11. The bar 11 includes the leading end 12 positioned at the leading edge side in the insert direction that is first inserted into the pipe P and the base end 13 connected to the driving apparatus.

Figure 18:
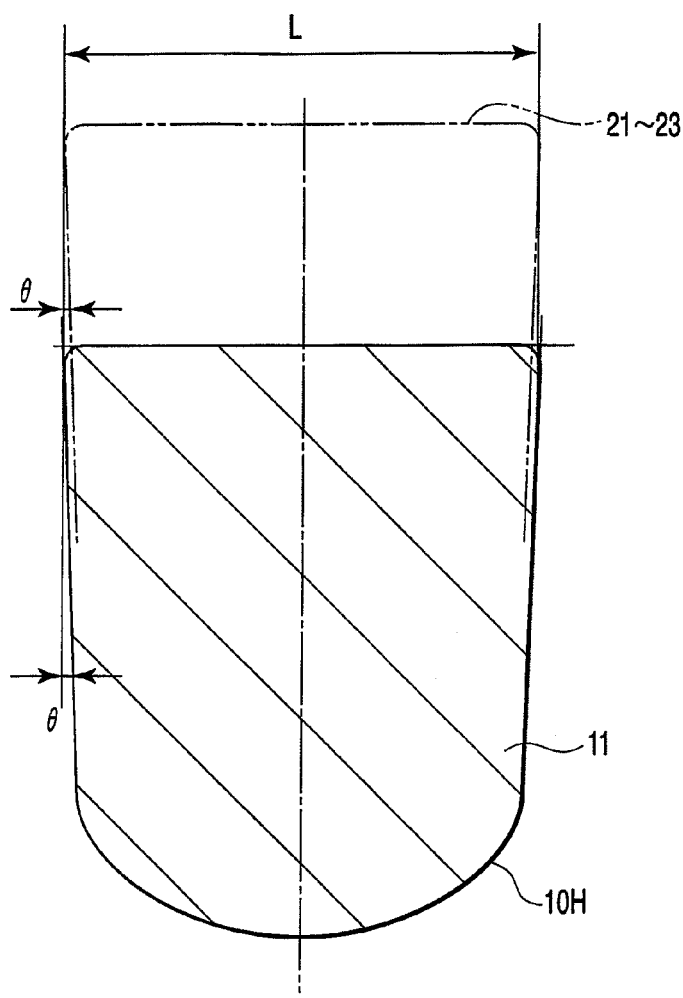
FIG. 18 is a cross-sectional view showing the main portions of the mandrel.
Figure 19:
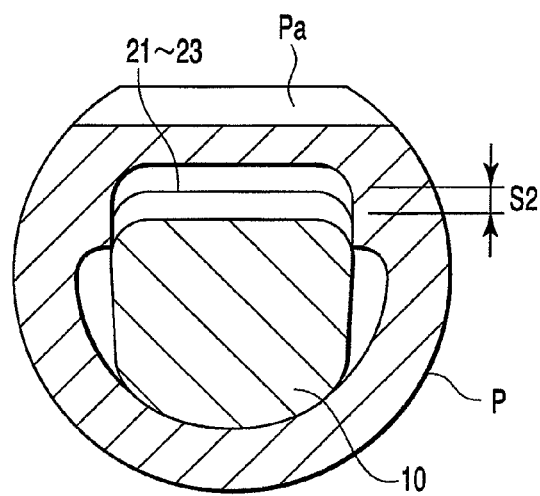
FIG. 19 is a cross-sectional view showing the main portions in a state where the mandrel is pressed into a pipe.
Figure 20:
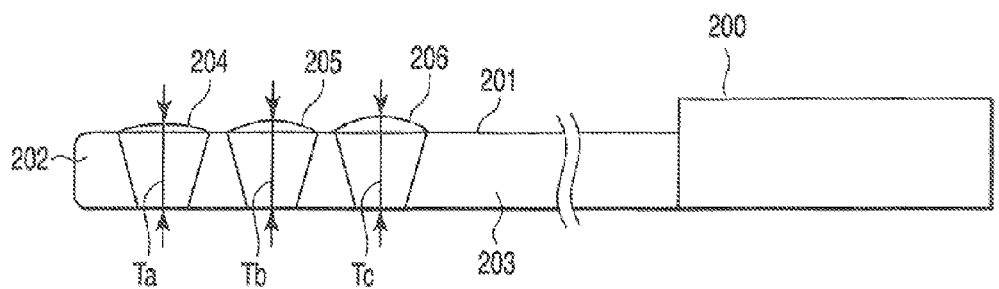
FIG. 20 is a side view showing one example of the mandrel.

The upper surface of the bar 11 is generally flat, but the three projected portions 21, 22, 23 are mounted in one body along an axial direction of the bar 11. Meanwhile, the bar 11 is closely attached to the inner peripheral surface of the pipe P in the bottom surface side thereof and can be linearly moved to the axial direction of the pipe P while maintaining the close attachment with the inner peripheral surface of the pipe P during a forging process. Also, the bar 11 has the maximum cross section region smaller than the minimum cross section region of the hollow portion of the pipe P. In other words, as will be described below, it is largely formed to enable the lower part of the flat portion Pa to be smoothly moved even after the pipe P is flattened and. Further, as shown in FIG. 18, the bar 11 is set to have a taper angle θ that makes the upper surfaces of the projected portions 21 to 23 a constant maximum width L and the widths thereof gradually decrease toward the lower portion, that is, the side opposing the tooth frame 130.

The taper angle θ is set to, for example, about 3°, but is not limited thereto. The taper angle θ is properly determined according to the wall thickness, inner diameter of the pipe P, etc.

Each projected portion 21 to 23 is provided with the guide surfaces in the smooth taper shape and is configured to enable the mandrel 10 to be smoothly moved irrespective of the flow resistance when molding. The maximum extent of the projected portions 21 to 23 is set to gradually increase from 1 to M.

The forging processing is performed on the pipe P using the thus configured mandrel 10H and the aforementioned hollow rack bar manufacturing apparatus 100 (see FIG. 2). Also, in FIG. 2, 10FA denotes a mandrel having the same configuration as the mandrel 10C.

The center portion of the pipe P is previously flattened in a concave shape by a separate frame so that the flat portion Pa where concave shape is a semicircular shape is formed. The pipe P is held between the upper frame 120 and the lower frame 110 so that the position of the flat portion Pa of the pipe P is determined to contact the tooth frame 130.

In this state, the press of the mandrel 10H to the pipe P is initiated. The mandrel 10H is guided into the hollow portion of the pipe P from its leading end 12. Then, the first projected portion 21 acts on the inner surface side of the flat portion Pa of the pipe P through the guide surface in the taper shape so that the wall of the pipe P is overhung toward a tooth shape of the tooth frame 130. Then, the press of the mandrel 10H is continued so that the overhang of the wall by sequential projected proportions 22, 23 is experienced, thereby performing the press forging. Next, the mandrel 10H moves to the withdrawing direction and the mandrel 10HA is inserted so that the press forging is alternately performed.

Therefore, the press and withdrawal of the mandrels 10, 10A is performed so that the press forging is performed. Next, the press and withdrawal of a next mandrel 10H, 10HA is performed. Thereafter, likewise with the foregoing, the predetermined processes are repeated while making the number of the mandrel 10H large by one so that the final processing is completed. Finally, the wall of the pipe P is sufficiently overhung corresponding to the prominence and depression of the tooth frame 130 due to the height of the mandrel 10H by pressing of the mandrel, completing transfer forging of the rack.

As described above, since the width of the upper surface of the mandrel 10H is constant from 1 to M so that the width is gradually reduced toward the lower portion and the portion where the mandrel 10H contacts the inner diameter of the pipe P is limited to a slight width S2 of the upper portion of the bar 11 and the projected portions 21 to 23, a useless contact becomes small. Also, as to the un-uniformity of the width caused when forming the bar 11, the contact to the pipe P is small, making it possible to ignore the fluctuation of the required molding load, make the required equipment possibly small, and reduce the cost of equipment.

As described above, with the set of mandrels according to the present embodiment, it is possible to reduce the fluctuation of the molding load required when inserting and reduce the unnecessary sliding, reduce the capacity of the driving apparatus, and reduce the cost of equipment. At the same time, the large press machine applying the load to the lower frame 110 and the upper frame 120 is not needed and the apparatus cost or the production cost can be reduced.

Also, the present configuration can obtain the same effects using the set of mandrels consisting of the short type mandrels and the hollow rack bar manufacturing apparatus 200.

Further, the present invention is not limited to the aforementioned embodiments. For example, the aforementioned examples use three projected portions, but the same effects can be obtained using four or more projected portions. In addition, various modified embodiments can be performed without departing from the spirit of the present invention.

Hereinafter, the modification examples will be described.

There is provided a mandrel used in a method of manufacturing a hollow rack bar by overhanging a wall of a hollow material from an inner diameter side toward a mold by pressing the mandrel into an inner cavity of the hollow material held to the mold, the mandrel comprising: a bar having an outer diameter smaller than an inner diameter of the hollow material; and at least four projected portions mounted along an axial direction of the bar and including a maximum projected portion with maximum projected extent, wherein the projected extent is set to gradually increase from the projected extent positioned at a leading end side in an axial direction of the bar to the maximum projected extent positioned second from a base end side in the axial direction thereof, and the extent of the projected portion positioned at the base end side in the axial direction of the bar is set to be less than or equal to the extent of the maximum projected portion.

There is provided a mandrel used in a method of manufacturing a hollow rack bar by overhanging a wall of a hollow material from an inner diameter side toward a mold by pressing the mandrel into an inner cavity of the hollow material held to the mold, the mandrel comprising: a bar having an outer diameter smaller than an inner diameter of the hollow material; and at least five projected portions mounted along an axial direction of the bar and including a maximum projected portion with maximum projected extent, wherein the projected extent is set to gradually increase from the projected portion positioned at the leading end side in the axial direction of the bar to the maximum projected portion positioned third from the base end side in the axial direction thereof, the extent of the projected portion positioned second from the base end side in the axial direction is set to be less than or equal to the extent of the maximum projected portion, and the extent of the projected portion positioned at the base end side in the axial direction of the bar is set to be less than or equal to the extent of the projected portion positioned second from the base end side in the axial direction.

There is provided a set of mandrels having M mandrels from 1 to M used in a method of manufacturing a hollow rack bar by overhanging a wall of a hollow material from an inner diameter side toward a mold by pressing the mandrel into an inner cavity of the hollow material held to the mold, the mandrel comprising: a bar having a maximum cross section region smaller than a minimum cross section region of a hollow portion of the hollow material; and a plurality of projected portions being provided to be projected on the bar and set to make the maximum projected extent thereof gradually increase from 1 to M, wherein the projected portion having the maximum extent of the plurality of projected portions is positioned at a center side, the height of the leading end is set to be smaller than the maximum projected extent of the mandrel having the one previous number, and the projected extent of the bar is set to be larger than the maximum extent of the projected portion of the mandrel having the one previous number.

There is provided a set of mandrels having M mandrels from 1 to M used in a method of manufacturing a hollow rack bar by overhanging a wall of a hollow material from an inner diameter side toward a mold by pressing the mandrel into an inner cavity of the hollow material held to the mold, the mandrel comprising: a bar having a maximum cross section region smaller than a minimum cross section region of a hollow portion of the hollow material; and a plurality of projected portions being provided to be projected on the bar and set to make the maximum projected extent thereof gradually increase from 1 to M, wherein the maximum projected extent of mandrel number 1 is set to be equal to the minimum cross-sectional region.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mandrel used in a method of manufacturing a hollow rack bar by overhanging a wall of a hollow material from an inner diameter side toward a mold by pressing the mandrel into an inner cavity of the hollow material held to the mold, the mandrel comprising:
   a bar having a maximum cross section region smaller than a minimum cross section region of a hollow portion of the hollow material; and
   three projected portions mounted only on a same surface along an axial direction of the bar and including a maximum projected portion with maximum projected extent, each projected portion having smoothly-tapered guide surfaces,
   wherein the extent of the projected portion positioned at a leading end side in the axial direction of the bar is smaller than the extent of the maximum projected portion,
   wherein the extent of the projected portion positioned at a base end side in the axial direction of the bar is smaller than the extent of the maximum projected portion, and
   wherein the maximum projected portion is positioned between the leading end side projected portion and the base end side projected portion.

2. The mandrel according to claim 1, wherein the leading end side is a leading end in a pressing direction to the inner cavity.

3. The mandrel according to claim 1, wherein the extent of the leading end side projected portion and the extent of the base end side projected portion are about the same.

4. The mandrel according to claim 1, wherein the smoothly-tapered guide surfaces of the projected portions do not contact one another.

5. A mandrel used in a method of manufacturing a hollow rack bar by overhanging a wall of a hollow material from an inner diameter side toward a mold by pressing the mandrel into an inner cavity of the hollow material held to the mold, the mandrel comprising:
   a bar having a maximum cross section region smaller than a minimum cross section region of a hollow portion of the hollow material; and
   three projected portions, including a maximum projected portion, mounted only on a same surface along an axial direction of the bar and disposed at the mold side, each projected portion having smoothly-tapered guide surfaces,
   wherein the extent of the projected portion positioned at a leading end side in the axial direction of the bar is smaller than the extent of the maximum projected portion,
   wherein the extent of the projected portion positioned at a base end side in the axial direction of the bar is smaller than the extent of the maximum projected portion,
   wherein the maximum projected portion is positioned between the leading end side projected portion and the base end side projected portion, and
   wherein a rear surface portion positioned opposing the three projected portions of the bar is provided with an outer peripheral pressing surface over a range corresponding to a sliding surface with a guide member for guiding the hollow rack bar from an outer peripheral surface side.

6. A set of mandrels having M mandrels from 1 to M used in a method of manufacturing a hollow rack bar by overhanging a wall of a hollow material from an inner diameter side toward a mold by pressing the mandrel into an inner cavity of the hollow material held to the mold, the M mandrels each comprising:
   a bar having a maximum cross section region smaller than a minimum cross section region of a hollow portion of the hollow material; and
   three projected portions, including a maximum projected portion, mounted only on a same surface and projected on the bar and set to make the maximum extent thereof gradually increase from 1 to M, each projected portion having smoothly-tapered guide surfaces,
   wherein the extent of the projected portion positioned at a leading end side in the axial direction of the bar is smaller than the extent of the maximum projected portion,
   wherein the extent of the projected portion positioned at a base end side in the axial direction of the bar is smaller than the extent of the maximum projected portion,
   wherein the maximum projected portion is positioned between the leading end side projected portion and the base end side projected portion, and
   when N is an integer less than or equal to M, the maximum extent of the three projected portions is set to make a difference between (N-1) and N smaller than a difference between (N-2) and (N-1).

7. A set of mandrels having M mandrels from 1 to M used in a method of manufacturing a hollow rack bar by overhanging a wall of a hollow material from an inner diameter side toward a mold by pressing the mandrel into an inner cavity of the hollow material held to the mold, the mandrel comprising:
   a bar having a maximum cross section region smaller than a minimum cross section region of a hollow portion of the hollow material; and
   three projected portions, including a maximum projected portion, mounted only on a same surface and projected on the bar and set to make the maximum extent thereof from 1 to M gradually increase and to make a maximum width thereof constant, each projected portion having smoothly-tapered guide surfaces, wherein the extent of the projected portion positioned at a leading end side in the axial direction of the bar is smaller than the extent of the maximum projected portion, wherein the extent of the projected portion positioned at a base end side in the axial direction of the bar is smaller than the extent of the maximum projected portion, and wherein the maximum projected portion is positioned between the leading end side projected portion and the base end side projected portion, and wherein the bar has maximum width at a maximum projected portion of the three projected portions and the width is set to be gradually reduced from the maximum projected portion toward a side opposing the mold.

* * * * *

UNITED STATES PATENT AND TRADEMARK OFFICE
CERTIFICATE OF CORRECTION

PATENT NO.        : 8,365,573 B2
APPLICATION NO.   : 12/035157
DATED             : February 5, 2013
INVENTOR(S)       : Takashi Yamawaki It is certified that error appears in the above-identified patent and that said Letters Patent is hereby corrected as shown below:

On the title page, Item (73) please change the Assignee's name Neutron Co., Ltd. to --Neturen Co., Ltd.--.

Signed and Sealed this
Fifteenth Day of April, 2014

Michelle K. Lee
*Deputy Director of the United States Patent and Trademark Office*